April 12, 1949.  R. G. WHITE  2,467,104
WAVE LENGTH METER
Filed March 7, 1944
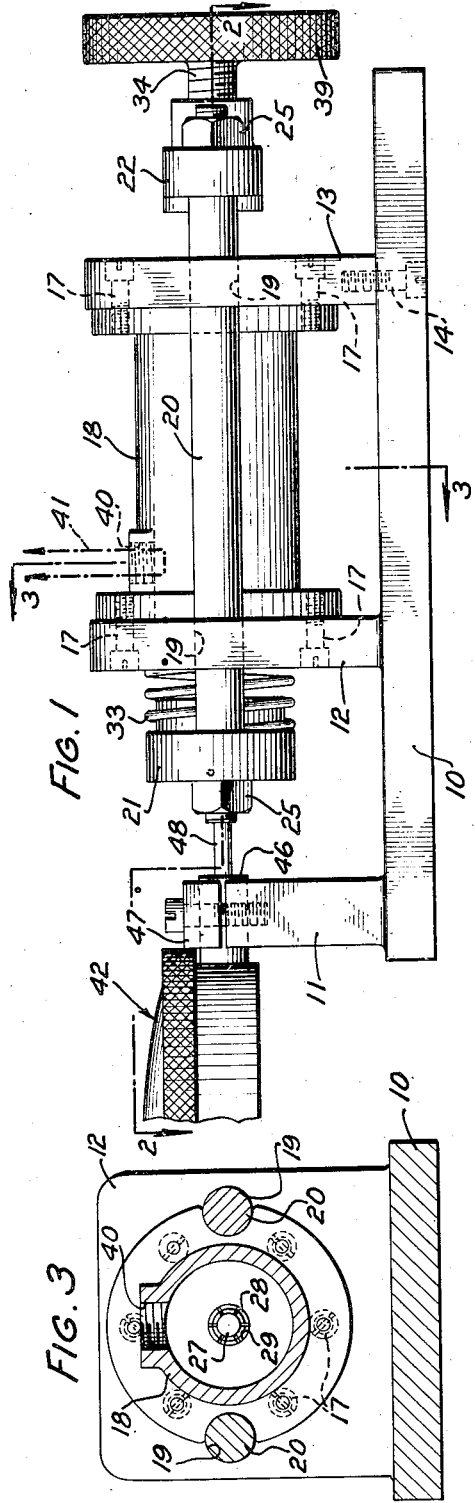
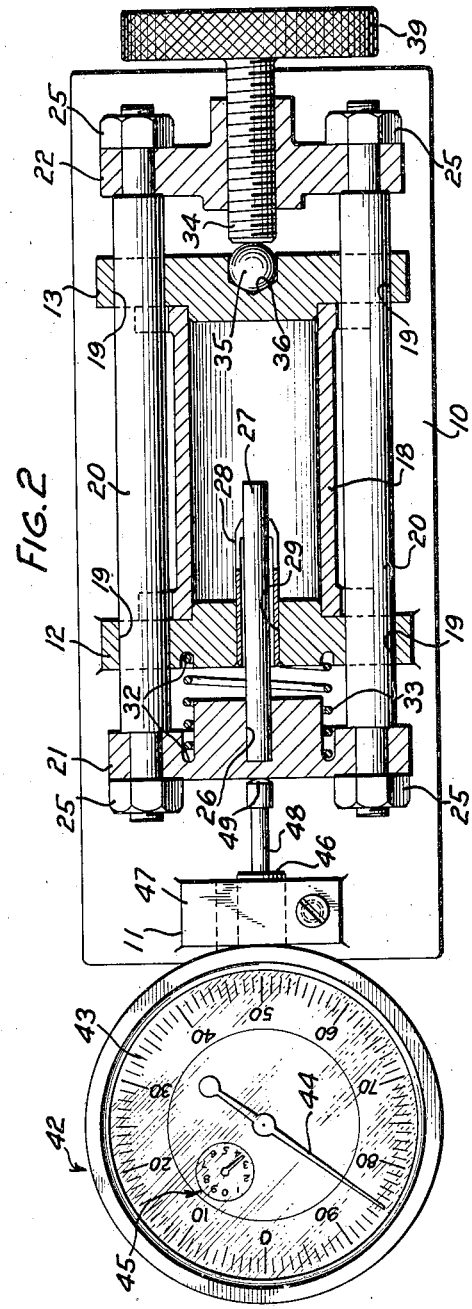
INVENTOR
R. G. WHITE - DECEASED
L. K. WHITE - ADMINISTRATRIX
BY Harry R. Duft
ATTORNEY Patented Apr. 12, 1949

2,467,104

UNITED STATES PATENT OFFICE 2,467,104

WAVE LENGTH METER

Russell G. White, deceased, late of Downers Grove, Ill., by Le Nada K. White, administratrix, Downers Grove, Ill., assignor to Western Electric Company, Incorporated, New York, N. Y., a corporation of New York Application March 7, 1944, Serial No. 525,429

7 Claims. (Cl. 178—44)

This invention relates to wave length meters and particularly to a tuning rod adjusting and indicating mechanism for such meters for measuring waves of ultra-high frequencies.

Wave length meters, in some instances, employ a tuning rod adjustable axially in a cylinder and a short-circuiting member mounted therein, the cylinder being open at one end. Rods of different lengths are employed for ranges of wave lengths or frequencies to be measured. The rod is adjusted relative to a loop of wire entered through an opening in the cylinder wall and arranged laterally of the rod, the looped wire carrying signal currents whose frequency or wave length is to be measured. For adjusting the rod relative to the short-circuiting member to increase or decrease the length of the rod extending from the short-circuiting member toward the open end of the cylinder, a micrometer head is directly operatively connected to the rod, and when resonance is obtained for the particular wave length being measured, as indicated in an associated circuit, the position of the rod as indicated on the micrometer head for such frequency is noted and recorded for subsequent use. With this type of rod adjustment, in which a high precision is required, difficulty is encountered in consistently getting accurate indications of adjusted positions of the rod, since it is difficult to take up all looseness in the operative connections between the rod and the head and also variations in and wear on the micrometric screw of the head occur, all of which directly affect the indicated position of the rod carried by the micrometer head.

An object of this invention is to provide a simple and practicable tuning rod adjusting and indicating mechanism for use in wave length meters for consistently and accurately measuring waves of ultra-high frequencies.

In accordance with the above object, the present invention, in one embodiment thereof, as applied to wave length meters of the above-described general type, comprises spring-pressed mounting means for a tuning rod axially adjustable in a cylinder which is closed at both ends, the cylinder and rod forming a resonant coaxial cylindrical cavity. A manually adjustable screw operatively connected to the spring-pressed rod mounting means is effective, upon rotation, to cause an increase or decrease in the length of the rod extending from a short-circuiting member, which closes one end of the cylinder, toward the opposite closed end of the cylinder. Directly bearing against the rod mounting means and entirely separated from the adjustable screw is an actuating pin or plunger of an indicating mechanism which is calibrated to indicate the position of the tuning rod in the cylinder when resonance is obtained.

Other objects and advantages of this invention will more fully appear from the following detailed description, taken in conjunction with the accompanying drawing, in which Fig. 1 is a fragmentary side view of a wave length meter tuning rod adjusting and indicating mechanism embodying the features of this invention;

Fig. 2 is a plan section taken on the line 2—2 of Fig. 1; and

Fig. 3 is a vertical section taken on the irregular line 3—3 of Fig. 1.

Referring to the drawing, the tuning rod adjusting and indicating mechanism comprises a base 10 having standards 11, 12 and 13 thereon. The standards 11 and 12 are integral with the base 10, while the standard 13 is secured by screws 14, one of which is shown in Fig. 1. Mounted between and secured by screws 17 to the standards 12 and 13 is a flanged tube or cylinder 18. Slidably guided in diametrically opposite apertures 19 formed in the standards 12 and 13 are rods 20, which extend at each end from the standards, the flanges on the cylinder 18 being cut away to permit free movement of the rods. Shouldered and screw-threaded outer ends of the rods 20 at each end are connected together by cross-heads 21 and 22, which are retained against shoulders on the rods by nuts 25 threaded onto the rods.

Drive-fitted in an aperture 26 of the cross head 21 is a tuning rod 27 of coin silver, which extends into the cylinder 18 through a hollow silver-plated split spring contact member 28 fixed within an aperture 29 of the standard 12, which also serves as a short-circuiting member, the rod being coaxially arranged with the cylinder. Formed in the opposed faces of the standard 12 and cross-head 21 are aligned annular channels 32, in which are entered opposite ends of a compression spring 33 constantly urging the cross-head 21 to the left, as viewed in Figs. 1 and 2, and therewith the cross-head 22, by means of the interconnecting slidable rods 20, such movement being limited in a manner to be presently described. The rod 27 is manually adjustable axially in the cylinder 18 by a screw 34 threaded through the cross-head 22 and bearing at its inner end against a ball 35 fixed in a depression 36 of the cross-head, the outer end of the screw having a knurled head 39 for grasping by an operator. It will be apparent that in rotating the screw 34, the rod 27 may be adjusted axially in the cylinder 18 to vary the length of the rod extending into the cylinder 18 from the inner face of the standard or short-circuiting member 12, depending on the direction of rotation of the screw head 39, the resonant wave length being approximately four times such length of the rod. A suitable aperture 40 is provided in the cylinder 18 for the entrance of a loop of wire, indicated in broken outline at 41 (Fig. 1), carrying signal currents whose frequency or wave length is to be measured and which currents are induced in the tuning rod 27. Associated with the loop of wire 41, in a manner well known in the art, is a circuit (not shown) for indicating when resonance is obtained for the particular wave length being measured. The inner surface of the cross-heads 12 and 13 and the cylinder 18, which bounds the cylindrical cavity into which extends the rod 27, are preferably silver-plated and have a mirror-like finish.

In order to indicate and record for subsequent use the position of the particular tuning rod 27 mounted in the cylinder when resonance is obtained for a known frequency or wave length, an indicating mechanism 42 is associated with the rod adjusting mechanism in the following manner. Such indicating mechanism 42 may be of a well-known dial gauge type having a face 43 calibrated, preferably in terms of wave lengths, in the present instance, hundredths of a meter, and an indicating pointer 44. Also included is a gauge and pointer, indicated in general at 45, for indicating wave lengths in meters. The mechanism 42 carries a projecting sleeve 46, which is clamped to the standard 11 by means of a split clamp 47, the standard and clamp having suitable cooperating depressions for receiving the sleeve and through which extends a spring-pressed actuating pin 48, which bears at its outer end at 49 directly against the cross-head 21.

In the use of the tuning rod adjusting and indicating mechanism of this invention, and assuming that the cylinder 18 is effective for the range of wave lengths or frequencies to be measured and the loop of wire 41 is connected to the previously mentioned circuit (not shown) for indicating when full resonance is obtained for the particular wave length being measured and the actuating pin 48 of the indicating mechanism 42 is bearing at 49 against the cross-head 21, at which time the pointer 44 may be at any point around the calibrated dial face 43, the operation is as follows:

The head 39 of the screw 34 is grasped by the operator and rotated in one direction or the other, which, in the manner previously described, causes the spring-pressed cross-head 21 to move and thereby to shift the tuning rod 27 in one direction or the other axially in the cylinder 18, the signal currents from the stationary wire loop 41 being induced in the rod, until, by its adjustment, full resonance is obtained in the coaxial cylindrical cavity, as indicated by the circuit connected to the wire loop for the particular wave length or frequency being measured.

Since the spring-pressed actuating pin 48 of the indicating mechanism 42 bears at 49 against the cross-head 21, it will be obvious that any movement of the cross-head 21 and the tuning rod 27 carried thereby will result in an identical movement of the pin 48 and thereby the resultant actuation of the pointer 44 relative to the calibrated face 43, in cooperation with the gauge and pointer 45, will indicate the position of the rod in the cylinder 18 when full resonance is obtained. Thus, with the indicating mechanism 42 directly associated with the cross-head 21, entirely separated from the adjusting screw 34 and solely responsive to the position of the cross-head 21, and accurate indication of the position of the rod 27 in the cylinder 18 will be indicated on the mechanism 42 for the particular wave length measured and one which may be readily read by an unskilled operator and may be recorded or plotted in graph form for future reference. The use of a completely closed resonant coaxial cylindrical cavity also provides for a more accurate adjustment of the tuning rod 27 since it prevents the entrance of dust and foreign particles thereinto, which would add to the difficulty of getting an accurate indication of the adjusted position of the tuning rod when full resonance is obtained.

What is claimed is:

1. A wave length meter comprising a member having a resonant cavity, a tuning rod movable axially therein through an apertured wall thereof movable means for supporting said rod, means operatively connected to said supporting means and engaging an opposite wall of said member for moving said supporting means to vary the position of said rod in said cavity, and an indicating mechanism responsive to the position of said supporting means for indicating the position of said rod in said cavity.

2. A wave length meter comprising a member having a resonant cavity, a tuning rod movable axially therein through an apertured wall thereof, reciprocatory means for supporting said rod, means operatively connected to said rod-supporting means and engaging an opposite wall of said member for reciprocating the rod supporting means to vary the position of said rod in said cavity, and an indicating mechanism directly engaging and solely responsive to the position of said supporting means for indicating the position of said rod in said cavity.

3. A wave length meter comprising a member having a resonant cavity, a tuning rod movable axially through an apertured wall thereof, movable means for supporting said rod, means operatively connected to said supporting means and engaging an opposite wall of said member for moving said supporting means in one direction, means cooperating with said last-mentioned means for constantly urging said support in an opposite direction to vary the position of said rod in said cavity, and an indicating mechanism solely responsive to the position of said supporting means for indicating the position of said rod in said cavity.

4. A wave length meter comprising a member having a resonant coaxial cavity, a tuning rod movable axially therein through an apertured wall thereof, movable means for supporting said rod, means operatively connected to said supporting means and engaging an opposite wall of said member for moving said supporting means to vary the position of said rod in said cavity, and an indicating mechanism having an actuating plunger engaging said supporting means for indicating the position of said rod in said cavity.

5. A wave length meter comprising a member having a resonant coaxial cavity, a tuning rod movable axially therein through an apertured wall thereof, movable means for supporting said rod, means having a screw-threaded connection with said supporting means and engaging an opposite wall of said member for moving said supporting means to vary the position of said rod in said cavity, and a dial gauge mechanism having an actuating pin engaging and following the movement of said supporting means for indicating the position of said rod.

6. A wave length meter comprising a member having a resonant cylindrical cavity and an end wall effective as a short-circuiting element, a tuning rod extending through an aperture in said element, conductively connected thereto and movable axially in said cavity, reciprocatory means for supporting said rod at one end of said member, means connected to said reciprocatory means and arranged adjacent the opposite end of said member, means operatively connected to said second means and engaging said member for causing reciprocatory movements of said first means and said connected rod, and an indicating mechanism directly engaging and solely actuated by movements of said reciprocatory means for indicating the position of said rod in said cavity.

7. A wave length meter comprising a member having a resonant cylindrical cavity and opposite end closure walls, one of which is effective as a short-circuiting element, a tuning rod extending through an aperture in said element and movable axially in said cavity, means for conductively connecting said rod to said short-circuiting member, spring-pressed reciprocatory means for supporting said rod in one end closure wall of said member and urging it in one direction, means connected to said last-mentioned means arranged adjacent the opposite end closure wall of said member, a screw rotatably threaded in said second means and operatively engaging said last-mentioned closure wall for causing reciprocatory movements of said first means and said connected rod, and an indicating mechanism directly engaging and solely actuated by movements of said reciprocatory means for indicating the position of said rod in said cavity.

LE NADA K. WHITE,
*Administratrix of the Estate of Russell G. White, Deceased.*

REFERENCES CITED

The following references are of record in the file of this patent:

UNITED STATES PATENTS

| Number | Name | Date |
|---|---|---|
| 1,006,924 | Erb | Oct. 24, 1911 |
| 2,086,615 | Grundmann | July 13, 1937 |
| 2,152,335 | Trevor et al. | Mar. 28, 1939 |
| 2,242,404 | Schussler | May 20, 1941 |